Figure 1:
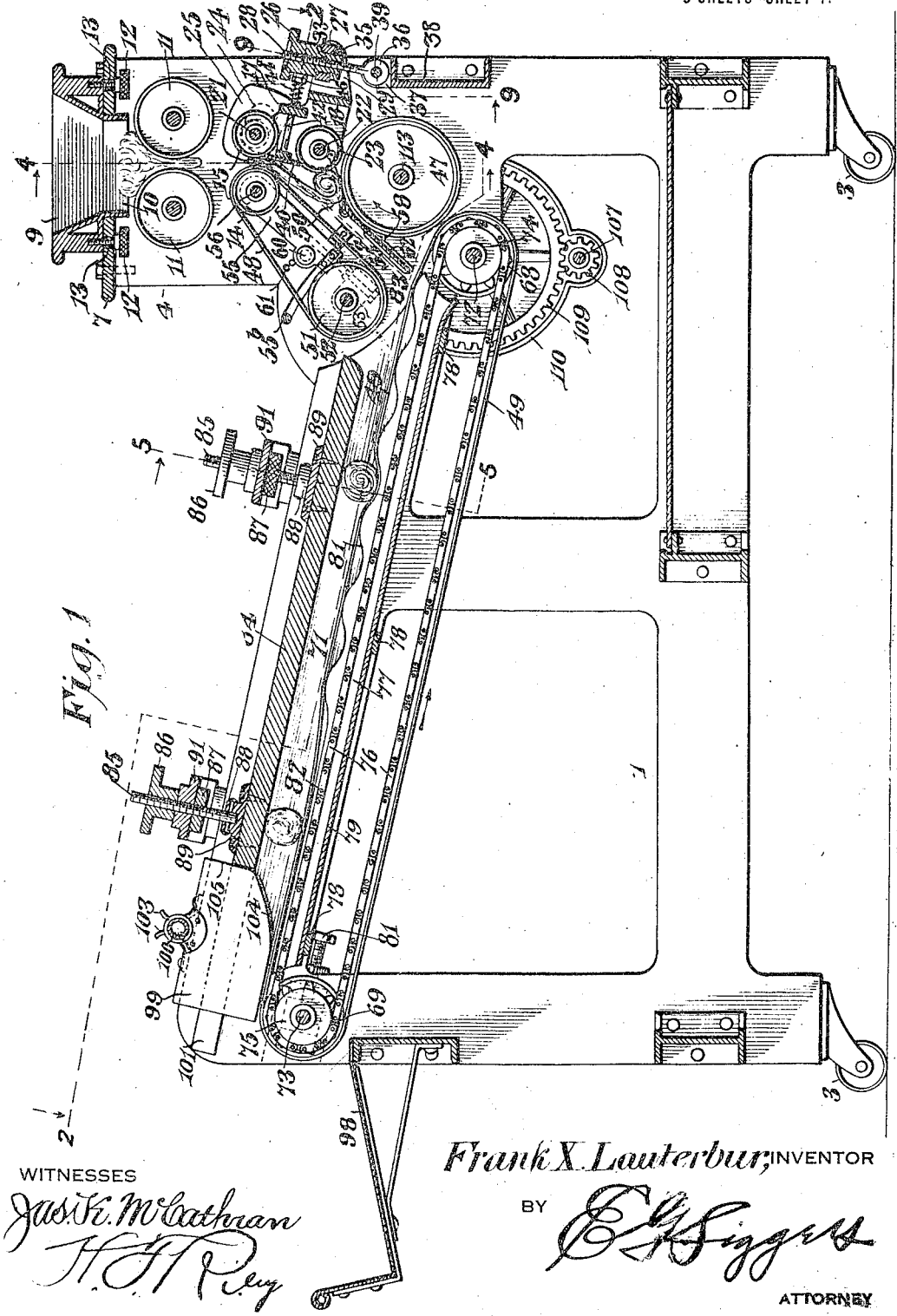

F. X. LAUTERBUR.
DOUGH MOLDING MACHINE.
APPLICATION FILED JUNE 10, 1913.

1,167,187.

Patented Jan. 4, 1916.
5 SHEETS—SHEET 1.

WITNESSES

Frank X. Lauterbur, INVENTOR
BY
ATTORNEY

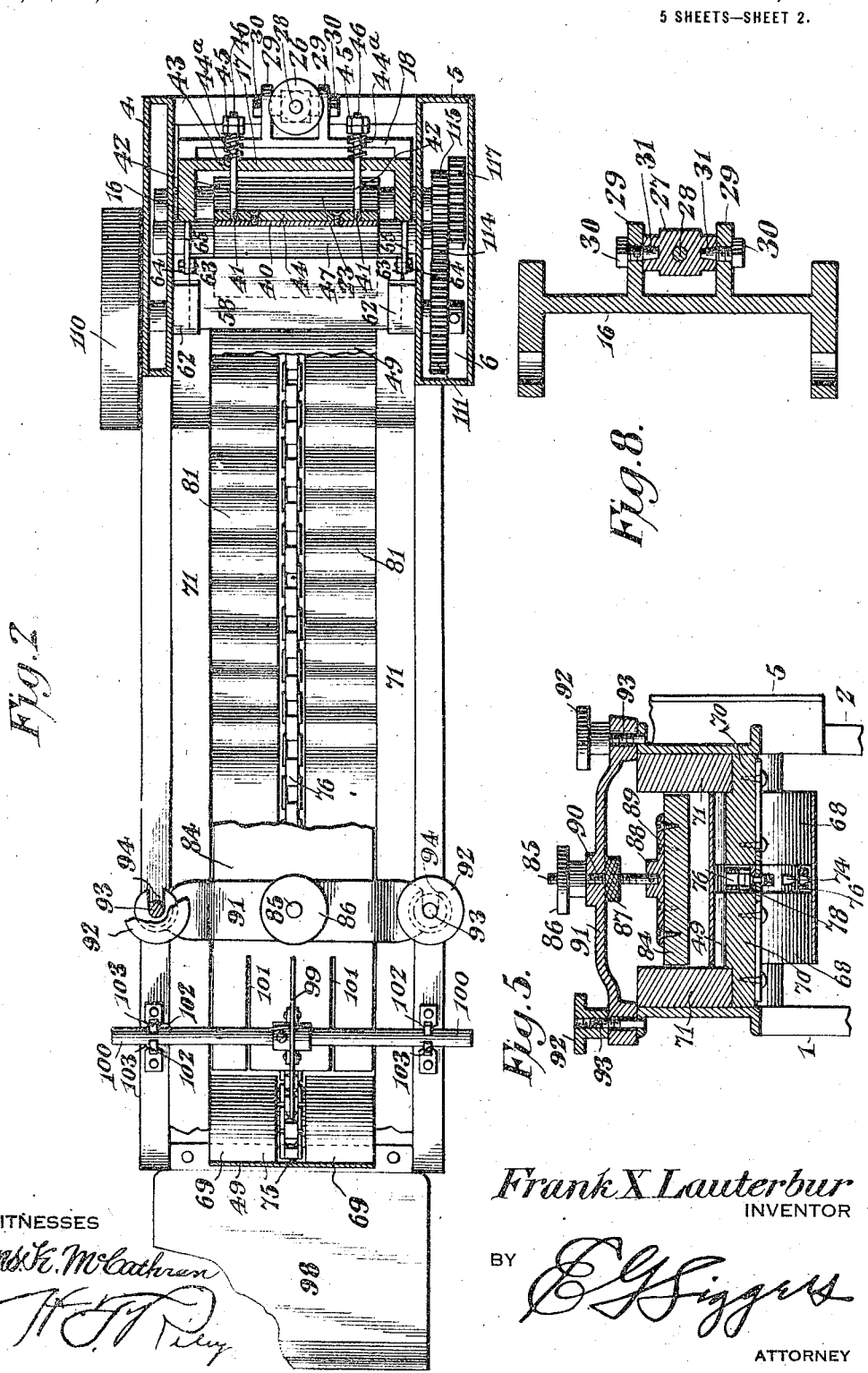

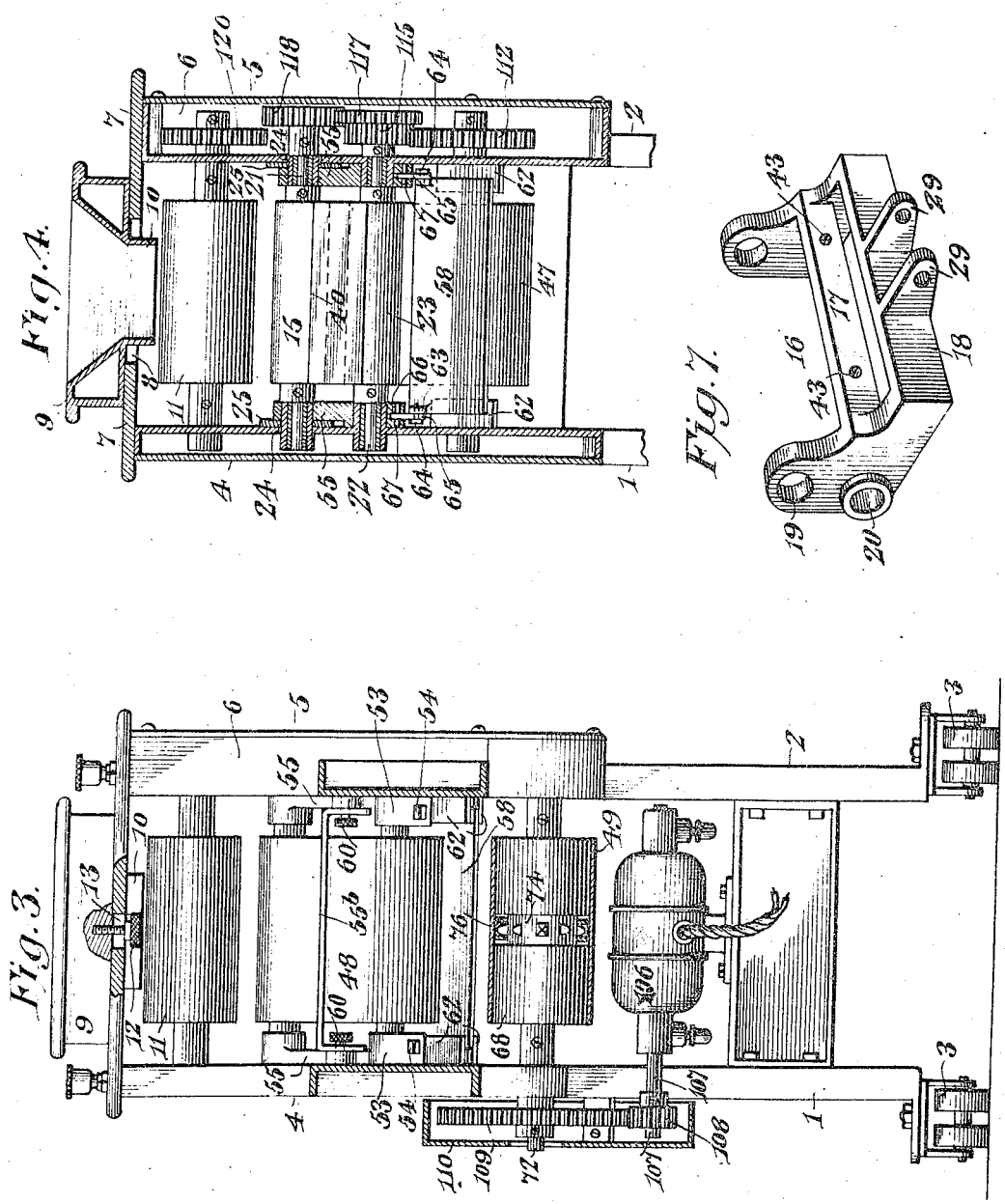

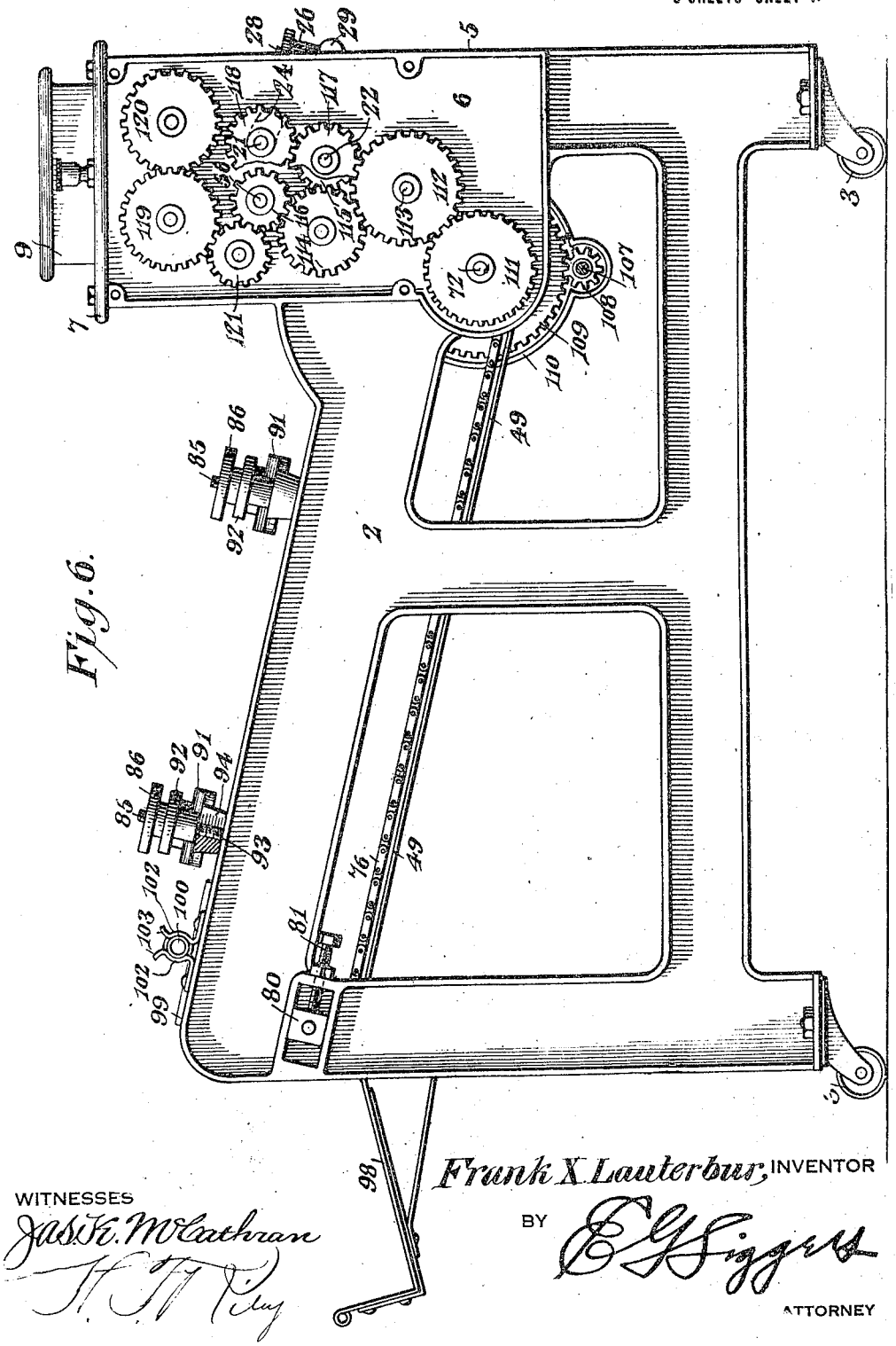

F. X. LAUTERBUR.
DOUGH MOLDING MACHINE.
APPLICATION FILED JUNE 10, 1913.
1,167,187.
Patented Jan. 4, 1916.
5 SHEETS—SHEET 5.
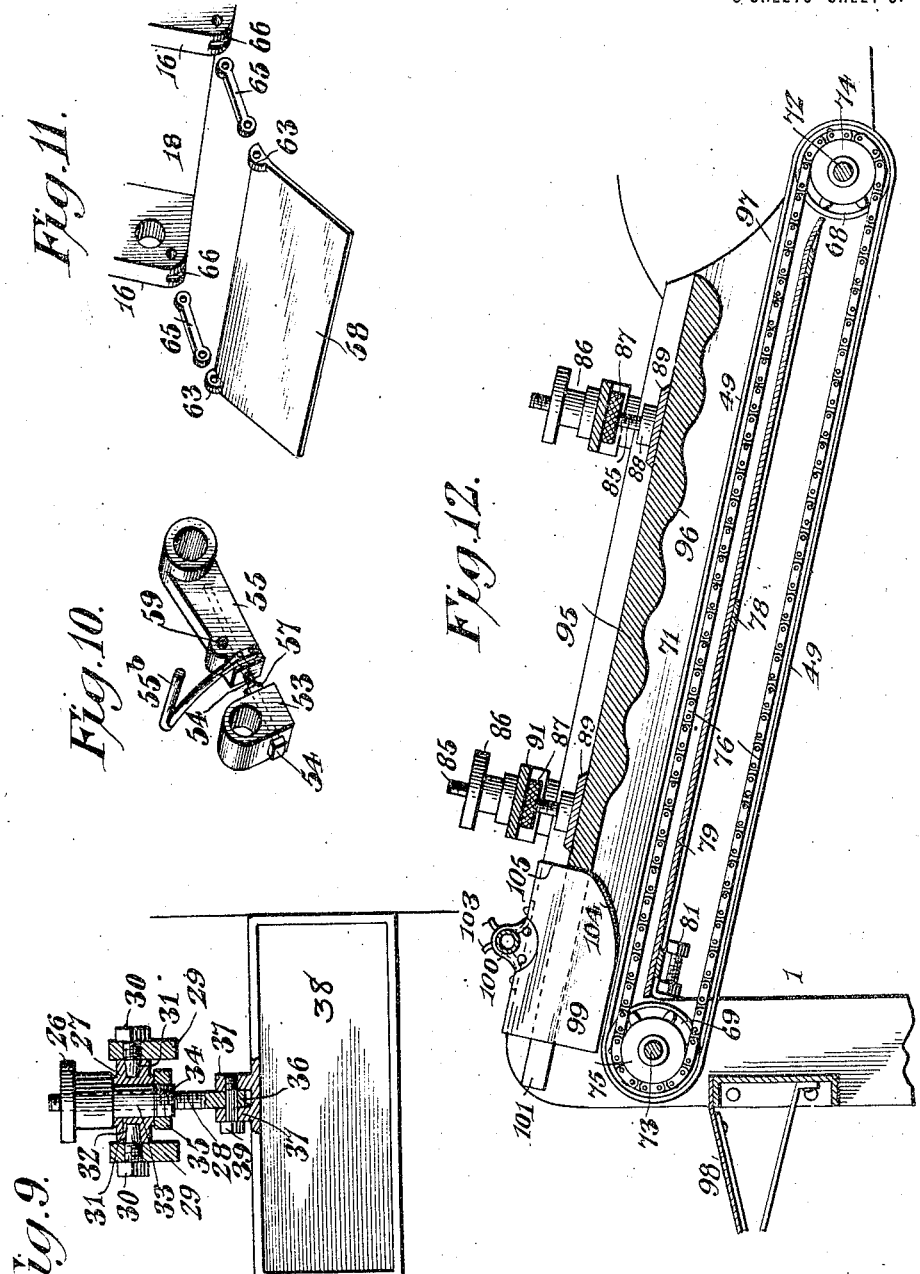
Frank X. Lauterbur, INVENTOR
WITNESSES
BY
ATTORNEY

UNITED STATES PATENT OFFICE.

FRANK X. LAUTERBUR, OF SIDNEY, OHIO.

DOUGH-MOLDING MACHINE.

1,167,187.  Specification of Letters Patent.  Patented Jan. 4, 1916.

Application filed June 10, 1913. Serial No. 772,869.

*To all whom it may concern:*

Be it known that I, FRANK X. LAUTERBUR, a citizen of the United States, residing at Sidney, in the county of Shelby and State of Ohio, have invented a new and useful Dough-Molding Machine, of which the following is a specification.

The invention relates to improvements in dough molding machines.

The object of the present invention is to improve the construction of dough molding machines, and to provide a simple, durable and efficient dough molding machine of comparatively inexpensive construction, adapted to form a lump of dough in a thin sheet and simultaneously expel the gas therefrom and then coil the sheet of dough into a spiral roll and finally through a kneading action and pressure to mold the roll into a loaf of the desired size and shape without killing or punishing the dough through too great working or excessive pressure in the treatment of the same, so that the dough will rise in the pan and make a nice loaf of bread.

A further object of the invention is to provide a dough molding machine capable of ready adjustment to arrange the parts to suit the character or condition of the dough operated on, and adapted to coil the sheet of dough as tightly or loosely as desired.

Another object of the invention is to enable the dough coiling or forming rolls to be arranged to form a pocket to receive the roll as it is formed and to retain the dough in proper contact with the forming rolls until the spiral roll or coil is completed, and to equip the machine with tripping means adapted to be engaged by the coiled roll and automatically operated to remove the dough from the said pocket and deliver the same to the mechanism for completing the molding or shaping of the loaf.

Furthermore, the invention has for its object to provide a machine, which in the molding and shaping of the dough, will in the handling of ordinary dough, leave the seam of the roll plainly visible in the completed loaf when the same leaves the machine, so that the dough loaves may be properly panned with the seam at the bottom of the pan to prevent the loaf in baking from breaking at the top.

The invention also has for its object to enable the machine to have a relatively low hopper and at the same time permit the dough to be panned table height to obviate the labor and inconvenience of stooping in removing the completed loaves from the receiving pan.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a central longitudinal sectional view of a dough molding machine, constructed in accordance with this invention. Fig. 2 is a horizontal sectional view on the line 2—2 of Fig. 1. Fig. 3 is an end elevation partly in section. Fig. 4 is a transverse sectional view on the line 4—4 of Fig. 1. Fig. 5 is a similar view on the line 5—5 of Fig. 1. Fig. 6 is a side elevation partly in section, illustrating the arrangement of the gearing. Fig. 7 is a detail perspective view of the adjustable frame for varying the distance between the pressure rolls. Fig. 8 is a sectional view of the same. Fig. 9 is a detail sectional view on the line 9—9 of Fig. 1. Fig. 10 is a detail perspective view of one of the oscillatory bearing arms of the trip belt. Fig. 11 is a detail perspective view, illustrating the construction of the trip plate and the means for connecting the same with the adjustable frame. Fig. 12 is a longitudinal sectional view of a portion of a dough shaping machine, showing a pressure board provided with means for subjecting the dough to a varying pressure during its passage through the molding or shaping box.

Like numerals of reference designate corresponding parts in all the figures of the drawings.

In the accompanying drawings in which is illustrated the preferred embodiment of the invention, the main frame of the dough making machine comprises in its construction spaced sides 1 and 2, suitably connected by transverse frame members and preferably mounted on rollers or wheels 3 to render it portable. The sides of the frame are provided at one end with integral vertical columns 4 and 5 preferably hollowed at their upper portions to provide a gear case 6 at one side of the machine and to house the projecting journals of the rolls at the opposite side of the machine. The columns 4 and 5 are connected by a horizontal top portion or plate 7, having a central oblong opening 8 into which extends an adjustably mounted hopper 9. The hopper 9, which is seated upon the top 7 of the frame, preferably consists of a casting, but it may be constructed in any other suitable manner, and it has a downwardly tapered interior and is provided at the bottom with depending vertical flanges 10, fitting the side walls of the opening 8 and extending downwardly to within a short distance of a pair of upper transverse feed rolls 11. The lower face of the hopper beyond the tapered opening is flat and the casting is preferably cored, as shown, to form a hollow interior to lighten the construction. The sides of the hopper are slightly thickened at the center and are tapped at the bottom to receive set screws 12, extending through slots 13 in the top 7 of the main frame and provided at their lower ends with heads and adapted to engage the lower face of the said top 7 to clamp the hopper in its adjustment. The hopper is adjustable with respect to the feed rolls to enable the lumps of dough to be delivered to the feed rolls at the desired point along the same.

The feed rolls 11 extend across the space between the sides of the frame and are journaled in suitable bearings in the upper portions of the columns or extensions 4 and 5 of the main frame, and they operate on a lump of dough to flatten it into a sheet and start it through the machine. The flattened dough, which moves downwardly between the feed rolls 11, is caught between inner and outer transverse pressure or sheeting rolls 14 and 15 and is formed into a thin sheet through the squeezing and rolling action of the said rolls 14 and 15, the outer pressure roll 15 being adjustably mounted in a frame 16 to move it toward and from the inner pressure roll 14 to vary the distance between them and the consequent thickness of the sheet into which the dough is rolled, thereby enabling the machine to be adjusted to suit the character or condition of the dough operated on and also to cause the dough to be subsequently wrapped or coiled into a spiral roll of as tight or loose a character as desired. The adjustable frame, which is composed of spaced approximately L-shaped sides and connecting transverse bars or portions 17 and 18, is provided with upper and lower bearing openings 19 and 20 through which extend the terminal portions of shafts 21 and 22 of the outer pressure roll and a forming roll 23. The lower shaft 22 constitutes a pivot or fulcrum for the adjustable frame and is arranged in suitable bearing openings of the sides of the frame, which is provided in its sides with arcuate slots 24 to receive the terminal portions of the upper shaft 21. Mounted on the terminal portions of the upper shaft 21 are plates 25, arranged to cover the arcuate slots 24 in each adjustment of the frame 16 to prevent any lubricant contained within the hollow portions of the columns from leaking through the said arcuate slots and reaching the rolls. These plates also exclude flour dust and dough from the bearings and the gearing which rotates the rolls. The frame carrying the outer pressure roll is adjusted by means of a nut 26, mounted for rotary movement in a pivoted block 27 of the adjustable frame 16 and engaging a screw 28, which is pivotally connected with the main frame. The transverse connecting bar 18 of the adjustable frame is provided with spaced outwardly projecting arms 29 having threaded perforations for the reception of pivot screws 30, having heads at their outer ends and provided at their inner terminals with smooth portions, projecting inwardly and arranged in bearing recesses 31 of the pivoted block 27. The block 27 extends across the space and fits snugly between the arms 29, and it is provided with a central opening 32 through which passes a tubular portion 33 of the nut 26. The tubular portion is provided with an exteriorly threaded portion 34 for the reception of a nut 35 arranged in spaced relation with the head of the nut 26 and retaining the tubular portion 33 in the central opening of the pivoted block 27.

The screw 28, which is arranged at a slight inclination, is provided at its lower end with an eye 36 and is pivoted between spaced ears 37 of a transverse frame member 38 by a bolt 39, piercing the ears 37 and engaging a threaded perforation in one of the ears. Any other suitable means, however, may be employed for pivotally mounting the screw on the main frame. The adjusting nut has a swivel connection with the pivoted block and when rotated is adapted to raise or lower the outer portion of the adjustable frame to rock the latter on the shaft 22 of the forming roll 23. The adjustable frame also carries a scraper 40 consisting of a plate of metal or other suitable material and arranged in a slightly inclined position with its upper and lower edges contiguous to the outer pressure roll 15 and the forming roll 23 respectively to prevent the dough from adhering to the same. The scraper is secured to the inner threaded terminals 41 of rods 42 adjustably mounted in perforations 43 of the transverse connecting bar 17 of the adjustable frame 16. The scraper is preferably provided at its outer face with a transverse cleat or bar 44 secured by screws or other suitable fastening means to the scraper and having threaded perforations for the reception of the inner threaded ends of the rods 42. The outer portions of the rods receive coiled springs 44ᵃ, interposed between the transverse connecting bar 17 and nuts 45 and adapted to yieldably maintain the scraper in contact with the rolls 15 and 23. The nuts 45 engage outer threaded terminals 46 of the rods 42 and are adapted to be adjusted to vary the tension of the coiled springs, and they are arranged in pairs to form a lock for retaining them in their adjusted positions.

The sheet of dough after passing between the pressure rolls and before being released by the same is engaged by a bottom forming roll 47, located below the pressure rolls and in spaced relation with the same and also below but in close proximity to the forming roll 23, which is considerably smaller than the bottom forming roll 47. The bottom forming roll 47, which rotates in the direction of the arrow in Fig. 1 of the drawings, catches the sheet of dough at the lower edge and carries the same into contact with the forming roll 23, which has the inner portion of its periphery moving upwardly in the same direction as roll 47. The forming roll 23 curls or buffs up the edge of the dough and coacts with the relatively large forming roll 47 to coil or wrap the sheet of dough into a spiral roll, as indicated in Fig. 1 of the drawings. When the spiral roll formed by the coiled or wrapped sheet of dough is completed, its size causes it to contact with a trip belt 48, having a downwardly moving adjacent stretch or flight adapted to carry the roll of dough away from the forming rolls to deliver the dough upon an endless traveling conveyer 49. The relatively large bottom forming or coiling roll 47 and the relatively small roll 23 form a space or pocket 50 to receive the dough and in which the latter is held during the coiling or wrapping process by the action of the forming rolls 23 and 47 in connection with the pressure rolls, which hold the dough until the same is completely formed into a thin sheet, the major portion of the roll being wrapped or coiled while the dough is held between the pressure rolls when the dough is rolled into a thin sheet. But in handling dough rolled into a thicker sheet, the latter may leave the pressure rolls before the sheet of dough is wrapped or coiled, and the trip belt will then operate as a wall for the pocket to maintain the dough in contact with the forming rolls until the sheet of dough is completely wrapped or coiled and is in condition to be discharged from the pocket 50. When the roll is completed, it is positively carried out of the pocket by the downward movement of the inner side of the trip belt. The roll 47 is designed to be covered with canvas or any other suitable material to enable it to engage properly with the dough, but it may be equipped with any other suitable form of dough engaging face.

The trip belt is arranged on the inner pressure roll 14 and on a lower apron roll 51, mounted on a transverse shaft 52, which is journaled in adjustable bearings 53 connected by screws 54 with oscillatory arms 55, which are hung from a shaft 56 on which the inner pressure roll is mounted. The bearings are adjusted to vary the distance between them and the outer ends of the arms 55. The bearings 53, which consist of blocks, are held between the heads of the screws and nuts 57, mounted on the screws between the bearings and the arms 55 and engaging the former, as clearly illustrated in Fig. 10 of the drawings. The screws 54, which extend longitudinally of the oscillatory arms 55, engage threaded bores or openings thereof, and the bearings 53 are adjustable to stretch the trip belt to the desired tension. The trip belt is arranged at an inclination, and its lower flight or stretch, which travels downwardly, is located at and constitutes the inner wall of the space or pocket 50 in which the roll is formed, and when the roll is completed, it attains a sufficient size to cause it to engage the downwardly moving flight of the trip belt, which carries the roll downwardly between the lower flight of the belt and a trip plate 58. The pivotal mounting of the trip belt enables it to adjust itself automatically to the increasing size of the roll and to provide a pocket of sufficient size to accommodate the amount of dough operated on by the forming rolls. The trip plate is forced outwardly with respect to the space or pocket 50 by the dough when the latter is of sufficient stiffness to overcome the weight of the trip belt and the means for mounting the same. Should, however, it be necessary to handle soft dough not having sufficient body to force the trip belt outwardly, the oscillatory arms are designed to be secured in fixed adjustment to meet such conditions to prevent the trip belt from squashing the dough. For this purpose the oscillatory arms are provided with threaded perforations 59 for the reception of screws 60, carried by the arms 55 and adapted to engage perforations 61 of the sides of the frame. The perforations 61 of each side of the frame are arranged in an arcuate series, and when the screws 60 are engaged with the sides of the frame, they rigidly maintain the trip belt in fixed relation with the pocket 50. The inward swing of the trip belt is limited by stops 55ᵃ, secured to the inner faces of the sides of the frame and arranged in the path of the arms 55. These stops may be in the form of buffers, and the said arms are connected by a bail 55ᵇ of approximately U-shape arching the trip belt and having its sides suitably secured to the oscillatory arms at the lower ends thereof. The bail is arranged to be readily grasped by the operator and is adapted to enable him to conveniently swing the trip belt upwardly and outwardly.

The trip plate 58, which is mounted in suitable guides 62 of the sides of the frame, is arranged at an inclination in substantial parallelism with the lower or inner stretch of the trip belt, and it is provided at its upper edge with ears 63 connected by suitable pivots 64 to links 65 located at opposite sides of the pocket or space 50 and pivoted in slots or bifurcations 66 of the sides of the adjustable frame by pins 67, or other suitable fastening devices. The links are connected with the sides of the adjustable frame below the pivot or fulcrum thereof, and the trip plate 58 is automatically adjusted with the adjustment of the outer pressure roll. By this construction, the trip plate is moved upwardly and downwardly in the guides 62 by the adjustable frame as the outer pressure roll 15 is carried inwardly and outwardly, and its position is varied with the changing or adjustment of the position of the said outer pressure roll 15. Only a relatively small amount of adjustment of the trip plate 58, however, is necessary to adapt it to the varying conditions of the dough and to the various sizes of spirally coiled rolls thereof. The trip plate presents a smooth surface to the roll of dough and enables the same to be readily carried out of the pocket 50 by the trip belt, and it also operates to guide the roll in its downward passage from the pocket 50 to the conveyer 49. The guides 62, which are arranged at an inclination, are shown in the drawings as consisting of spaced flanges projecting from the inner faces of the sides of the frame, but any other suitable guiding means may, of course, be employed for slidably mounting the trip plate.

The traveling endless conveyer 49, which may be constructed of canvas or any other flexible material, is arranged at an inclination and extends downwardly and inwardly to a point beyond the lower edge of the trip plate, and it is arranged upon inner and outer rolls 68 and 69 and its upper flight or stretch travels over the bottom 70 of an inclined longitudinally disposed molding or shaping box 71, designed to be constructed of any suitable material and composed of spaced sides and the said bottom 70. The sides of the molding or shaping box have inner vertical faces and the endless conveyer 49 extends across the space between the sides of the molding or shaping box and is supported upon and travels over the bottom 70 thereof. The inner and outer rolls 68 and 69 which are mounted on transverse shafts 72 and 73, are composed of sections separated at the center to provide central spaces for the reception of sprocket wheels 74 and 75, which are connected by a sprocket chain 76. The bottom 70 of the molding or shaping box is composed of spaced longitudinal sections forming a central channel or space 77 to receive the upper stretch or flight of the sprocket chain. The sections of the bottom 70 of the shaping or molding box are preferably connected at intervals by transverse cleats or bars 78, which support a longitudinally disposed chain guard 79, consisting of a bar or strip of metal arranged in the bottom of the groove or channel 77 and suitably secured to the transverse cleats 78. The groove or channel may, however, be formed in any other suitable manner. The transverse shafts 72 and 73 are journaled in suitable bearings at opposite sides of the frame and the bearings 80 for the outer shaft 73 are adjustable by screws 81 to place the sprocket chain and conveyer under the desired tension. The sprocket chain 76 travels in the direction of the arrow in Fig. 1 of the drawings, the lower flight or stretch moving downwardly and inwardly and the upper flight or stretch upwardly and outwardly, the sprocket chain being driven from the inner shaft 72 by the means hereinafter described. This places the driving strain on the lower stretch or flight of the sprocket chain and through the inner and outer sprocket wheels the traveling belt has a double drive and is relieved from the strain incident to transmitting motion from one apron or conveyer roll to the other, thereby greatly increasing the durability of the endless traveling conveyer as the latter operates simply as a conveyer to carry the spirally coiled rolls of dough through the molding and shaping box. Also by driving the inner shaft 72 and placing the tension on the lower stretch of the sprocket chain, the said lower stretch is maintained taut and the upper stretch of the endless conveyer is relatively slackened for a purpose about to be described. Various other forms and arrangements of gearing may be employed for positively driving both of the conveyer rolls, but it is preferable to employ a belt or chain with the drive at the bottom, as shown. Also while the central arrangement of the sprocket chain is deemed most advantageous, it may be placed in any other suitable position, for instance, at the side or sides of the machine, and the conveyer may be either inclined or horizontal.

The bottom 70 of the molding or shaping box is provided for a portion of its length with a transversely straight and longitudinal undulatory or waved upper kneading surface 81, presenting a sinuous or serpentine contour composed of alternate convex and concave portions over which the rolls of dough are carried by the flexible endless conveyer, which conforms to the configuration of the said kneading surface 81, the dough being subjected to a varying pressure while traveling through the kneading box and being alternately compressed and released through the wave-like contour of the said kneading surface 81. The upper flight of the traveling conveyer is sufficiently slack to enable it to drop into the transverse grooves or depressions intervening between the raised rounded transverse portions or enlargements. The kneading surface 81 preferably extends slightly over one half the length of the molding or shaping box, but it can, of course, be made of any length to secure the desired kneading or working of the dough in the shaping or molding of the same into a loaf. By kneading the dough in this manner, it may be formed or molded into a loaf of the desired size and shape without the necessity of subjecting it to excessive pressure, and the treatment of the dough is such that it is not killed or punished and will rise in the pan and make a nice loaf possessing all the advantages of a hand made loaf, but superior to the same owing to its uniformity in size, shape and texture. Also with ordinary dough, the seam will be plainly visible so that the loaf may be properly panned with the seam at the bottom. The roll of dough is widened out during its passage over the kneading surface to form a loaf of a length corresponding to the width of the molding or shaping box, and the inner faces of the sides of the kneading box are smooth and operate to buff or finish the ends of the loaf. The upper portion 82 of the bottom of the box is smooth and the pressure on the dough is decreased during the buffing of the ends and the finishing of the shaping or molding of the loaf.

The inclination of the endless conveyer and the opposite inclination of the trip plate form a lower pocket 83 into which the spiral roll of dough is deposited after it is tripped from the upper pocket. The lower pocket 83 serves to properly position the roll of dough and operates to start the same properly through the molding or shaping box, however, owing to the kneading surface any irregularity in the position of the roll as it enters the molding box will be taken care of and a finished loaf of the proper size and shape will be produced, owing to the treatment the dough receives in traveling over the undulatory kneading surface 81.

The molding box is equipped with an upper adjustable pressure board 84, arranged at an inclination and suspended between the sides of the molding or shaping box by means of adjusting devices, each comprising a screw 85 and upper and lower nuts 86 and 87. The screws are suitably secured in sockets 88 of attaching plates 89, which are fastened by screws or other suitable means to the upper face of the pressure board. The said screws 85 extend through central openings 90 of transverse supporting bars 91 preferably arched slightly, as illustrated in Fig. 5 of the drawings, and having their terminals seated upon and secured to the sides of the main frame by clamping nuts 92, mounted on screws 93, which project from the upper faces or edges of the sides of the main frame. The ends of the transverse supporting bars 91 are provided with recesses 94 to enable them to be readily engaged with and disengaged from the projecting screws 93, thereby permitting the pressure board to be readily placed in and removed from the shaping or molding box. When the nuts 92 are tightened the transverse supporting bars 91 are securely clamped upon the sides of the main frame. The nuts 86 and 87, which engage the upper and lower faces of the transverse supporting bars at the center thereof, enable the pressure board to be arranged within the molding or shaping box the desired distance from the bottom thereof, and the pressure board is susceptible of any adjustment within the said box and may be dropped as low as desired, as there is nothing to interfere with such downward adjustment of the pressure board. The lower face of the pressure board, shown in Fig. 1, of the drawings, is smooth, and the rolls of dough passing through the molding and shaping box contact with the lower face of the pressure board and owing to the fixed adjustment of the said pressure board, the dough is subjected to a rolling as well as a squeezing action through the coaction of the lower traveling conveyer and the fixed pressure board.

It is obvious that the arrangement of the undulatory surface of the kneading box and the smooth face of the pressure board may be reversed, and in Fig. 12 of the drawings is illustrated another form of the invention in which the pressure board 95 is provided with a lower dough engaging surface 96, having a sinuous or undulatory form similar to the upper kneading surface 81 of the shaping or molding box 71. In this form of the invention, the bottom 97 of the molding or shaping box has a smooth upper surface over which the upper flight or stretch of the endless conveyer travels. A lower kneading surface is, of course, preferable as the dough is readily carried out of the depressions or grooves by the forward movement of the endless conveyer, and there is no resistance to the passage of the dough due to any tendency of the same to stick or adhere to the kneading surface in the depressions thereof. If desired, the dough while traveling through the molding or shaping box may be acted on by both upper and lower undulatory kneading surfaces to secure the desired pressure and kneading action in the treatment of the dough. The kneading box may be constructed of any desired width to mold a dough loaf of the desired length, and the adjustment of the pressure board enables the latter to be arranged to suit the size of the molded dough loaf, which, prior to being discharged from the machine onto a receiving pan 98, may be severed into smaller loaves or pieces of the desired size by a cutter consisting of one or more blades 99 secured to a transverse rod 100 and adapted to extend through kerfs 101 at the outer end of the pressure board. The transverse rod 100 is supported upon the upper edges or faces of the sides of the main frame and is detachably held in position by clamps 102 preferably consisting of resilient jaws arranged in pairs and adapted to engage the terminal portions of the rod 100 at opposite sides thereof, the upper ends 103 of the jaws are extended in opposite directions to form a flaring mouth or entrance to enable the transverse rod of the cutter to be readily snapped into the clamps.

The blade 99, which may be secured to the transverse rod 100 in any suitable manner, extends through the kerf 101 and projects below the lower face of the pressure board, and its lower inner corner is preferably cut away to provide an inclined cutting edge 104. The inner end edge 105 of the blade 99 is preferably straight and fits against the shoulder or end wall at the inner end of the kerf 101 to coöperate with the clamps for holding the blade rigidly in operative position, but any other means may, of course, be employed for this purpose. The receiving pan 98, which may be of any preferred construction, is arranged table height to enable the loaves to be conveniently removed from it without stooping, and the downward and inward inclination of the endless conveyer and the pressure board contributes not only to the formation of the lower pocket, but also enables the hopper to be arranged relatively low without producing a corresponding drop in the position of the receiving pan.

In order to produce a portable self-contained machine, the latter is preferably driven by an electric motor 106 suitably mounted upon one of the connecting transverse members of the main frame at a point below the inner shaft 72 of the conveyer. The motor may be of any preferred type and is adapted to be connected with any suitable source of electrical supply. The motor shaft 107 is equipped with a spur pinion 108, which meshes with a relatively large spur gear wheel 109 fixed to one end of the shaft 72 and housed within a suitable wheel guard 110. This gearing, which transmits motion from the electric motor to the conveyer, is located at one side of the machine. The gearing for rotating the other rolls is arranged at the opposite side of the machine in the gear case 6 and consists of a spur gear wheel 111, mounted on the inner transverse shaft 72 of the conveyer and meshing with a similar gear wheel 112, which is suitably fixed to the shaft 113 upon which the bottom forming roll 47 is mounted. The gear wheel 112 meshes with an idler gear 114, which communicates motion to a pinion 115 of the shaft 22 of the forming roll 23 and to a pinion or gear 116 of the shaft of the inner pressure roll 14. The shaft 22 also carries a gear wheel 117, which meshes with a gear wheel 118 of the shaft 21 of the outer pressure roll 15 for rotating the latter. The pinions or gears 115 and 116 are of substantially the same diameter, and the gears 117 and 118 are also of uniform size so that the inner and outer pressure rolls 15 and 16, the forming roll 23 and the trip belt travel at practically a uniform speed. Mounted upon the shafts of the feed rolls 11 are intermeshing gear wheels 119 and 120, and motion is communicated to the feed rolls from the shaft of the inner pressure roll by means of an idler gear 121, meshing with the gear 116 of the inner pressure roll and with the adjacent gear 119 of the inner feed roll 11. The rolls may be driven by any other suitable arrangement of gearing, and the location of such gearing within the gear case formed by the hollow extension or column of the side 2 of the main frame forms a guard for the gearing and protects the same from dust.

What is claimed is:—

1. A dough molding machine, comprising an endless conveyer for carrying the dough through the machine, means for exerting pressure on the dough as it is fed through the machine for shaping it, and means for driving the conveyer for causing the stretch of the conveyer conducting the dough to have greater flexibility than the other stretch.

2. A dough molding machine including a main frame having a supporting portion provided with an opening, feed rolls mounted in the frame below the opening and adapted to flatten a lump of dough and feed the same into the machine, a hopper adjustably mounted on the said supporting portion of the frame and extending into and guided by the said opening and adapted to be arranged in different positions along the same, and means for securing the hopper in its adjustment.

3. A dough molding machine including a main frame having a supporting portion provided with an opening having opposite parallel guiding walls or edges, feed rolls mounted in the frame below the opening and adapted to flatten and feed a lump of dough into the machine, an adjustable hopper seated upon the said supporting portions of the frame and having depending flanges extending through the said opening and fitted against and guided by the said walls or edges thereof, and means for securing the hopper in its adjustment.

4. A dough molding machine including a main frame provided with a supporting portion having an opening and provided at opposite sides thereof with slots, feed rolls mounted in the main frame below the opening and adapted to flatten a lump of dough and feed the same into the machine, an adjustable hopper arranged upon the said supporting portion of the frame at the opening thereof and having a tapered interior and cored to form hollow walls, said walls being thickened at opposite portions and provided therein with threaded sockets, and set screws operating in the slots of the said supporting portion and engaging the threaded sockets of the hopper to secure the latter in its adjustment.

5. A dough molding machine including a pair of pressure rolls adapted to roll the dough into a sheet, forming rolls arranged below the pressure rolls and adapted to coil or wrap the sheet of dough into a roll, and a trip belt independent of the forming rolls located opposite the forming rolls and coacting therewith to form a dough receiving pocket and yieldably mounted and adapted to be forced outwardly by the dough to vary the size of the pocket.

6. A dough molding machine including a pair of pressure rolls adapted to roll the dough into a sheet, forming rolls arranged below the pressure rolls and adapted to coil or wrap the sheet of dough into a roll, and a trip belt arranged on one of the pressure rolls and located opposite the forming rolls and coöperating therewith to provide a dough receiving pocket, said trip belt being yieldably mounted and adapted to be forced outwardly by the dough to vary the size of the pocket.

7. A dough molding machine including a pair of pressure rolls adapted to roll the dough into a sheet, forming rolls arranged below the pressure rolls and adapted to coil or wrap the sheet of dough into a roll, a trip belt located opposite the forming rolls and coacting therewith to form a dough receiving pocket and yieldably mounted and adapted to be forced outwardly by the dough to vary the size of the pocket, and means for limiting the inward movement of the trip belt toward and holding it from the forming rolls.

8. A dough molding machine including a pair of pressure rolls adapted to roll the dough into a sheet, forming rolls arranged below the pressure rolls and adapted to coil or wrap the sheet of dough into a roll, a trip belt located opposite the forming rolls and coacting therewith to form a dough receiving pocket and yieldably mounted and adapted to be forced outwardly by the dough to vary the size of the pocket, and means for securing the trip belt in an adjusted position to maintain the same in a relatively fixed postion with relation to the pocket for operating on soft dough.

9. A dough molding machine including a pair of pressure rolls adapted to form the dough into a sheet, forming rolls for coiling or wrapping the sheet of dough into a roll, oscillatory arms, an apron roll carried by the said arms, and a trip belt arranged on the apron roll and on one of the pressure rolls and coacting with the forming rolls to provide a dough receiving pocket and adapted to be forced outward automatically by the dough to vary the size of the pocket.

10. A dough molding machine including a pair of pressure rolls adapted to form the dough into a sheet, forming rolls for coiling or wrapping the sheet of dough into a roll, oscillatory arms, an apron roll carried by the said arms, a trip belt arranged on the apron roll and on one of the pressure rolls and coacting with the forming rolls to provide a dough receiving pocket and adapted to be forced outward automatically by the dough to vary the size of the pocket, and stops arranged in the path of the arms for limiting the inward swing of the same.

11. A dough molding machine including a pair of pressure rolls adapted to form the dough into a sheet, forming rolls for coiling or wrapping the sheet of dough into a roll, oscillatory arms, an apron roll carried by the said arms, a trip belt arranged on the apron roll and on one of the pressure rolls and coacting with the forming rolls to provide a dough receiving pocket and adapted to be forced outward automatically by the dough to vary the size of the pocket, and means for securing the arms in an adjusted position to maintain the belt in fixed relation with the forming rolls.

12. A dough molding machine including a frame provided with an arcuate series of perforations, pressure rolls adapted to form the dough into a sheet, forming rolls for wrapping or coiling the sheet of dough into a roll, oscillatory arms mounted within the frame, an apron roll carried by the arms, a trip belt arranged on the apron roll and on one of the pressure rolls and adapted to be carried inwardly and outwardly with respect to the forming rolls by the said arms, and an adjusting screw carried by an oscillatory arm and arranged to engage the said perforations for securing the belt in an adjusted position.

13. A dough molding machine including a pair of pressure rolls adapted to form the dough into a sheet, forming rolls for coiling or wrapping the sheet of dough into a roll, oscillatory arms, an apron roll carried by the said arms, a trip belt arranged on the apron roll and on one of the pressure rolls and coacting with the forming rolls to provide a dough receiving pocket and adapted to be forced outward automatically by the dough to vary the size of the pocket, and a bail connected with the arms and spanning the outer portion of the trip belt.

14. A dough molding machine including a pair of pressure rolls adapted to form the dough into a sheet, a forming roll located beneath the pressure rolls, means coacting with the forming roll for coiling or wrapping the sheet of dough into a spiral roll, an adjustable frame pivoted by the forming roll and carrying one of the pressure rolls, and means for adjusting the frame to swing the pressure roll carried by it toward and from the other pressure roll to vary the thickness of the sheet of dough.

15. A dough molding machine including a pair of pressure rolls adapted to form the dough into a sheet, a forming roll located beneath the pressure rolls, means coacting with the forming roll for coiling or wrapping the sheet of dough into a spiral roll, an adjustable frame pivoted by the said forming roll and carrying one of the pressure rolls, a pivotally mounted screw, and a nut engaging the screw and mounted on the frame for pivotal and rotary movement to adjust the pressure roll carried by it toward and from the other pressure roll to vary the thickness of the sheet of dough.

16. A dough molding machine including a pair of pressure rolls adapted to form the dough into a sheet, a forming roll located beneath the pressure roll, means coacting with the forming roll for coiling or wrapping the sheet of dough into a spiral roll, an adjustable frame pivoted by the said forming roll and carrying one of the pressure rolls, a block pivotally mounted on the adjustable frame, a nut swiveled to the block, and a screw pivoted to a relatively fixed portion of the machine and engaged by the nut, whereby the frame is adjusted to swing the pressure roll carried by it toward and from the other pressure roll to vary the thickness of the sheet of dough.

17. A dough molding machine including a pair of pressure rolls adapted to form the dough into a sheet, a forming roll located beneath the pressure rolls, means coacting with the forming roll for coiling or wrapping the sheet of dough into a spiral roll, an adjustable frame pivoted by the said forming roll and carrying one of the pressure rolls, a block pivotally mounted on the adjustable frame and having an opening, a nut having a reduced tubular portion extending through the opening, means mounted on the reduced portion for retaining the same in the opening, and a screw pivotally connected with a relatively fixed portion of the machine and engaged by the nut to adjust the frame and swing the pressure roll carried by the same toward and from the other pressure roll to vary the thickness of the sheet of dough.

18. A dough molding machine including a main frame, a pair of pressure rolls, a forming roll located below the pressure rolls and having a shaft journaled in the main frame, an adjustable frame pivotally mounted on the shaft of the said forming roll and carrying one of the pressure rolls and adapted to swing the pressure roll carried by it toward and from the other pressure roll to vary the thickness of the sheet of dough, and means for securing the adjustable frame in its adjustment.

19. A dough molding machine including a pair of pressure rolls adapted to form the dough into a sheet, a lower forming roll, means coacting with the forming roll to wrap or coil the sheet of dough into a spiral roll, an adjustable frame pivoted at the axis of the forming roll and carrying one of the pressure rolls, and a scraper yieldably mounted on the adjustable frame and arranged contiguous to the forming roll and the adjustable pressure roll.

20. A dough molding machine including pressure rolls adapted to form the dough into a sheet, forming rolls located below the pressure rolls for coiling or wrapping the sheet of dough, a trip belt arranged opposite the forming rolls and coacting therewith to provide a dough receiving pocket, an adjustable frame carrying one of the pressure rolls, and a yieldably mounted trip plate connected with and automatically adjusted by the said frame when the latter is adjusted, said trip plate being arranged to coöperate with the trip belt in removing the coiled or wrapped dough from the said pocket.

21. A dough molding machine including a main frame provided at opposite sides with guides, a pair of pressure rolls adapted to form the dough into a sheet, forming rolls located below the pressure rolls for coiling or wrapping the sheet of dough, a trip belt located opposite the forming rolls, an adjustable frame movably mounted within the main frame and carrying one of the pressure rolls, and a trip plate spaced from and coöperating with the trip belt and slidably mounted in the said guides, and means for connecting the trip plate with the adjustable frame, whereby the trip plate will be adjusted simultaneously with the said adjustable frame.

22. A dough molding machine including a main frame, a pair of pressure rolls adapted to form the dough into a sheet, forming rolls located below the pressure rolls for coiling or wrapping the sheet of dough, an adjustable frame pivotally mounted in the main frame and carrying one of the pressure rolls for varying the distance between the latter, a trip belt arranged opposite the forming rolls, and a trip plate movably mounted within the main frame in spaced relation with the trip belt and connected with the adjustable frame below the pivotal point thereof, whereby the pivoted frame and the trip plate are simultaneously adjusted.

23. A dough molding machine including a pair of pressure rolls adapted to form the dough into a sheet, forming rolls located below the pressure rolls for coiling or wrapping the sheet of dough, a trip belt arranged opposite the forming rolls and coacting therewith to provide a dough receiving pocket, an adjustable frame mounted within the main frame and carrying one of the pressure rolls for varying the distance between the same, a trip plate spaced from and coacting with the trip belt, and links located at opposite sides of the pocket and connecting the trip plate with the adjustable frame, whereby the trip plate is adjusted simultaneously with the said adjustable frame.

24. A dough molding machine including a pair of pressure rolls adapted to form the dough into a sheet, a relatively small forming roll located below the pressure rolls, a relatively large bottom forming roll arranged adjacent to the relatively small forming roll and having a relatively rough peripheral surface to engage the dough and carry the same to the small forming roll, and a pivotally mounted oscillatory trip belt arranged opposite and independent of the forming rolls and coacting therewith to form a dough receiving pocket.

25. A dough molding machine including a pair of pressure rolls adapted to form the dough into a thin sheet, means for coiling or wrapping the sheet of dough and comprising a belt passing around one of the pressure rolls and extending downwardly therefrom, an inclined trip and guiding plate extending from the said means and coacting with the lower portion of said belt, an oppositely inclined molding or shaping box coacting with the said plate to form a pocket, and means for conveying the dough through the said box and for subjecting the dough to pressure.

26. A dough molding machine comprising pressure rolls adapted to form the dough into a sheet, means for fashioning the sheet of dough, means for conducting the fashioned dough through the machine, means for exerting a pressure on the dough as it is fed through the machine, and means for imparting motion to said conducting means for causing said conducting means to have a sufficient amount of flexibility to assist in kneading the dough.

27. A dough molding machine including a molding or shaping box having smooth vertical side walls adapted to shape the ends of a loaf, a pressure board coacting with the bottom of the box, and a conveyer for carrying the dough through the space between the bottom of the box and the pressure board, said machine being provided in the box with means for alternately varying the pressure on the dough to knead the same, said means consisting of a transversely straight and longitudinally undulatory kneading surface having alternate concave and convex portions, and the surface opposing the said undulatory kneading surface being flat, and means for causing the surface of the conveyer conducting the dough to have greater flexibility than the other surface.

28. A dough molding machine including a molding or shaping box having spaced smooth vertical sides for shaping the ends of a loaf and provided with a bottom, said bottom having along a portion of its length a transversely straight and longitudinally undulatory kneading surface for operating on a straight roll composed of alternately arranged concave and convex portions, said bottom being also provided beyond the kneading surface with a smooth flat bottom surface arranged to reduce the pressure on the dough, a pressure board mounted between the sides of the box and coacting with the bottom thereof, means for conducting the dough through the machine, and means for imparting motion to said conducting means and causing said conducting means to have a sufficient amount of flexibility to assist in kneading the dough.

29. A dough molding machine including an undulatory kneading surface forming alternate depressions adn raised portions, an endless conveyer having a stretch or flight moving over the said surface, end rolls for the said conveyer, and gearing connecting and positively driving the rolls at a uniform speed and adapted to relieve the conveyer of strain, whereby a relatively slack conveyer may be employed to permit the said conveyer and the dough carried thereby to drop into the depressions of the undulatory surface.

30. A dough molding machine including an undulatory kneading surface forming alternate depressions and raised portions, an endless conveyer having a stretch or flight moving over the said surface, end rolls for the said conveyer, and sprocket gearing connecting the said rolls at a uniform speed and having a taut lower driving flight or stretch to permit a relatively slack portion of the conveyer to travel over the said undulatory kneading surface.

31. A dough molding machine including a molding or shaping box, means for conveying the dough through the box and for subjecting the dough to pressure to form the same into a loaf, said means including a pressure board having a kerf, and a cutter provided with a blade extending through the kerf of the pressure board and arranged in the path of the dough to cut the loaf into smaller loaves.

32. A dough molding machine including a main frame, a molding or shaping box mounted within the frame, means for conveying the dough through the molding or shaping box, a pressure board coacting with the said box and provided with a kerf, and a cutter consisting of a transverse supporting member mounted on the frame, and a blade secured to the said member and extending through the kerf of the pressure board into the path of the dough.

33. A dough molding machine comprising a main frame, a molding or shaping box mounted within the frame, means for conveying the dough through the shaping or molding box and for subjecting the dough to pressure, a cutter consisting of a transverse member spanning the molding or shaping box and provided with a blade extending into the path of the dough, and clamps mounted on the frame and having yieldable jaws for detachably engaging the transverse member.

34. A dough molding machine including an endless conveyer having upper and lower stretches, the upper stretch being adapted to carry the dough, means for exerting a pressure on the dough to shape the same, end rolls for the said conveyer, a chain connecting the rolls, and means for driving the said chain from the bottom to positively rotate the said rolls at a uniform speed and to produce a slackness in the upper stretch, whereby a relatively slack portion of the conveyer is permitted to travel along the pressure producing means.

35. A dough molding machine including a molding or shaping box having smooth vertical sides for shaping the ends of a loaf, a conveyer for carrying the dough through the box, end rolls for the conveyer, and means for positively driving the said end rolls at a uniform speed to relieve the conveyer of strain and permitting slackness in the upper stretch.

36. A dough molding machine including a pair of pressure rolls adapted to form the dough into a thin sheet, means for coiling or wrapping the sheet of dough comprising a belt passing around one of the pressure rolls and extending downwardly therefrom, and an inclined trip and guiding plate extending from the said means and coöperating with the lower portion of the said belt.

In testimony, that I claim the foregoing as my own, I have hereto affixed my signature in the presence of two witnesses.

FRANK X. LAUTERBUR.

Witnesses:
JOHN H. SIGGERS,
H. T. RILEY.